(12) United States Patent  (10) Patent No.: US 7,609,395 B2
Harada et al.  (45) Date of Patent: Oct. 27, 2009

(54) IMAGE FORMING APPARATUS

(75) Inventors: Kohsuke Harada, Nara (JP); Michiyuki Suzuki, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 801 days.

(21) Appl. No.: 11/357,588

(22) Filed: Feb. 17, 2006

(65) Prior Publication Data

US 2006/0181717 A1  Aug. 17, 2006

(30) Foreign Application Priority Data

Feb. 17, 2005  (JP) ............................ P2005-040800

(51) Int. Cl.
*G06K 15/00* (2006.01)

(52) U.S. Cl. ...................... 358/1.1; 358/1.12; 358/1.13; 715/244; 399/87

(58) Field of Classification Search .................. 358/1.1, 358/1.12, 1.13, 1.15; 715/244; 399/87
See application file for complete search history.

(56) References Cited

U.S. PATENT DOCUMENTS 5,815,764 A * 9/1998 Tomory ........................... 399/1

7,515,244 B2 * 4/2009 Ozawa ....................... 358/1.15
2006/0244936 A1 * 11/2006 Ozawa ........................ 355/40

FOREIGN PATENT DOCUMENTS

| JP | 2001-150740 A | 6/2001 |
| JP | 2003-101700 | 4/2003 |
| JP | 2004-173291 A | 6/2004 |

* cited by examiner

*Primary Examiner*—Kimberly A Williams
(74) *Attorney, Agent, or Firm*—Edwards Angell Palmer & Dodge LLP

(57) ABSTRACT

In an image forming apparatus, at the time of print recording of a set of image data to a plurality of recording sheets, by the use of a recording sheet interval that is an interval between a position where print recording of a recording sheet of the plurality of recording sheets ends and a position where print recording of a succeeding recording sheet starts, an image processing portion executes image processing of another set of image data read by a scanner portion and divided by an image dividing portion, in accordance with an operation command of a control portion.

6 Claims, 17 Drawing Sheets

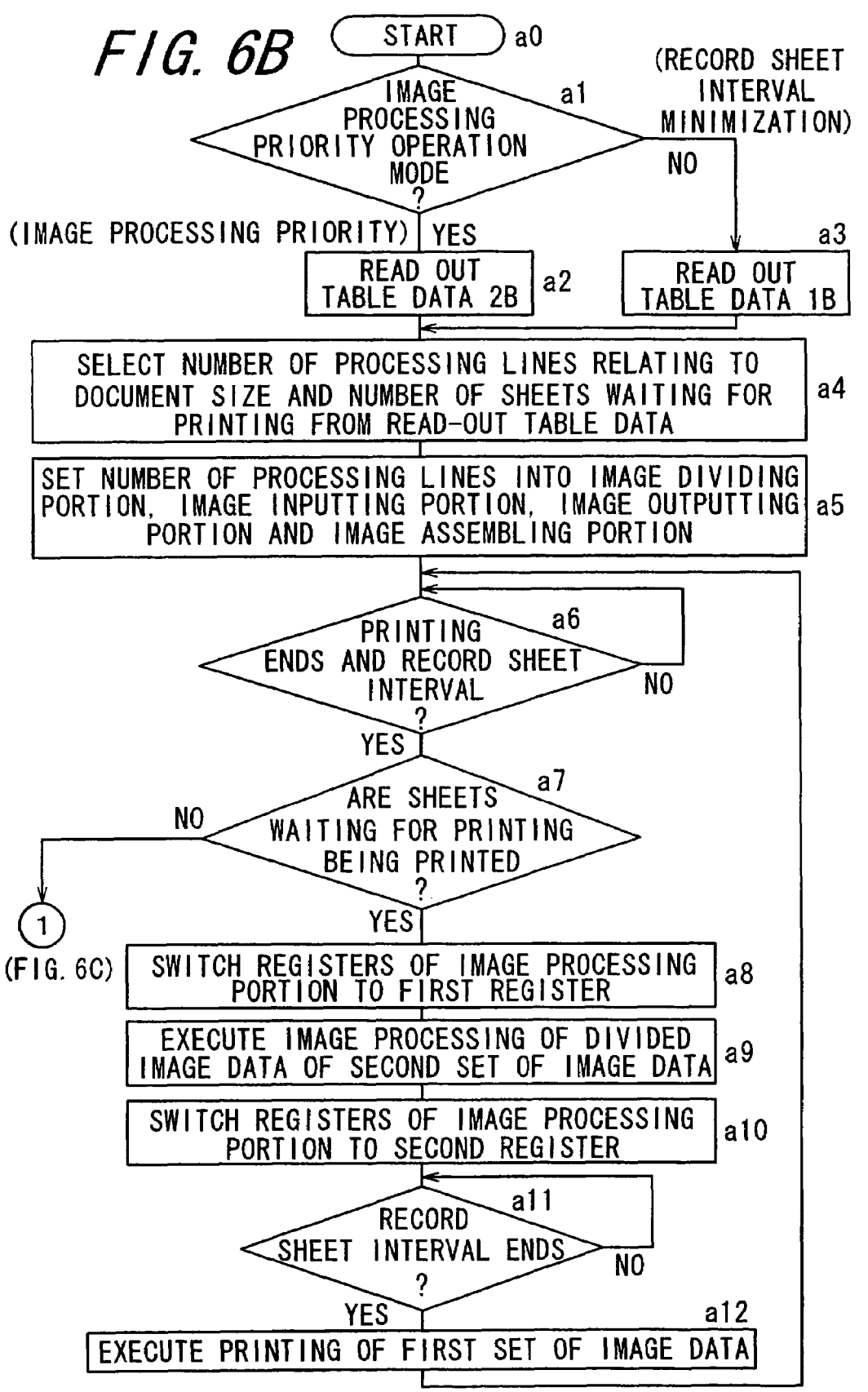

FIG. 7A

RECORD SHEET INTERVAL MINIMIZATION
(NUMBER OF LINES IS FIXED)
(NUMBER OF PROCESSING LINES)

TABLE DATA 1A

| | DOCUMENT SIZE | | |
|---|---|---|---|
| | A4 | B4 | A3 |
| NUMBER OF PROCESSING LINES | 1131 | 1131 | 1131 |

NUMBER OF LINES THAT CAN BE PROCESSED IN MINIMUM RECORD SHEET INTERVAL DISTANCE

FIG. 7B

RECORD SHEET INTERVAL MINIMIZATION
(NUMBER OF LINES IS VARIABLE)
(NUMBER OF PROCESSING LINES)

TABLE DATA 1B

| NUMBER OF PAGES WAITING FOR PRINTING | DOCUMENT SIZE | | |
|---|---|---|---|
| | A4 | B4 | A3 |
| 2~3 | 2480 | 4300 | 4960 |
| 4~5 | 2120 | 3675 | 4239 |
| 6~9 | 1812 | 3141 | 3623 |
| 10 PAGES OR MORE | 1131 | 1131 | 1131 |

NUMBER OF LINES THAT CAN BE PROCESSED IN MINIMUM RECORD SHEET INTERVAL DISTANCE

FIG. 7C

RECORD SHEET INTERVAL MINIMIZATION
(NUMBER OF LINES IS FIXED)
(IN CASE OF PRINT PAPER SIZE LARGER THAN A4)
(NUMBER OF PROCESSING LINES)

| TABLE DATA 1C | DOCUMENT SIZE | | |
|---|---|---|---|
| | A4 | B4 | A3 |
| NUMBER OF PROCESSING LINES | 2262 | 2262 | 2262 |

RECORD SHEET INTERVAL DISTANCE IS DOUBLE AND NUMBER OF PROCESSING LINES IS DOUBLE

FIG. 7D

RECORD SHEET INTERVAL MINIMIZATION
(NUMBER OF LINES IS VARIABLE)
(IN CASE OF PRINT PAPER SIZE LARGER THAN A4)
(NUMBER OF PROCESSING LINES)

TABLE DATA 1D

| NUMBER OF PAGES WAITING FOR PRINTING | DOCUMENT SIZE | | |
|---|---|---|---|
| | A4 | B4 | A3 |
| 2~3 | 4960 | 8600 | 9920 |
| 4~5 | 4239 | 7350 | 8479 |
| 6~9 | 3623 | 6282 | 7247 |
| 10 PAGES OR MORE | 2262 | 2262 | 2262 |

RECORD SHEET INTERVAL DISTANCE IS DOUBLE AND NUMBER OF PROCESSING LINES IS DOUBLE

FIG. 8A

IMAGE PROCESSING PRIORITY (NUMBER OF LINES IS FIXED)
(NUMBER OF PROCESSING LINES)

| TABLE DATA 2A | DOCUMENT SIZE | | |
|---|---|---|---|
| | A4 | B4 | A3 |
| NUMBER OF PROCESSING LINES | 2480 | 4300 | 4960 |

ONE HALF NUMBER OF LINES OF ONE SHEET OF DOCUMENT

FIG. 8B  IMAGE PROCESSING PRIORITY (NUMBER OF LINES IS VARIABLE)
(NUMBER OF PROCESSING LINES)

TABLE DATA 2B

| NUMBER OF PAGES WAITING FOR PRINTING | DOCUMENT SIZE | | |
|---|---|---|---|
| | A4 | B4 | A3 |
| 2~3 | 2480 | 4300 | 4960 |
| 4~5 | 2480 | 4300 | 4960 |
| 6~9 | 2480 | 4300 | 4960 |
| 10 PAGES OR MORE | 1240 | 2150 | 2480 |

ONE QUARTER NUMBER OF LINES OF ONE SHEET OF DOCUMENT

ONE HALF NUMBER OF LINES OF ONE SHEET OF DOCUMENT

FIG. 8C

IMAGE PROCESSING PRIORITY (NUMBER OF LINES IS FIXED)
(IN CASE OF PRINT PAPER SIZE LARGER THAN A4)
(NUMBER OF PROCESSING LINES)

| TABLE DATA 2C | DOCUMENT SIZE | | |
|---|---|---|---|
| | A4 | B4 | A3 |
| NUMBER OF PROCESSING LINES | 2480 | 4300 | 4960 |

ONE HALF NUMBER OF LINES OF ONE SHEET OF DOCUMENT

FIG. 8D  IMAGE PROCESSING PRIORITY (NUMBER OF LINES IS VARIABLE)
(IN CASE OF PRINT PAPER SIZE LARGER THAN A4)
(NUMBER OF PROCESSING LINES)

TABLE DATA 2D

| NUMBER OF PAGES WAITING FOR PRINTING | DOCUMENT SIZE | | |
|---|---|---|---|
| | A4 | B4 | A3 |
| 2~3 | 4960 | 8600 | 9920 |
| 4~5 | 4960 | 8600 | 9920 |
| 6~9 | 4960 | 8600 | 9920 |
| 10 PAGES OR MORE | 2480 | 4300 | 4960 |

ONE HALF NUMBER OF LINES OF ONE SHEET OF DOCUMENT

ONE FIRST NUMBER OF LINES OF ONE SHEET OF DOCUMENT

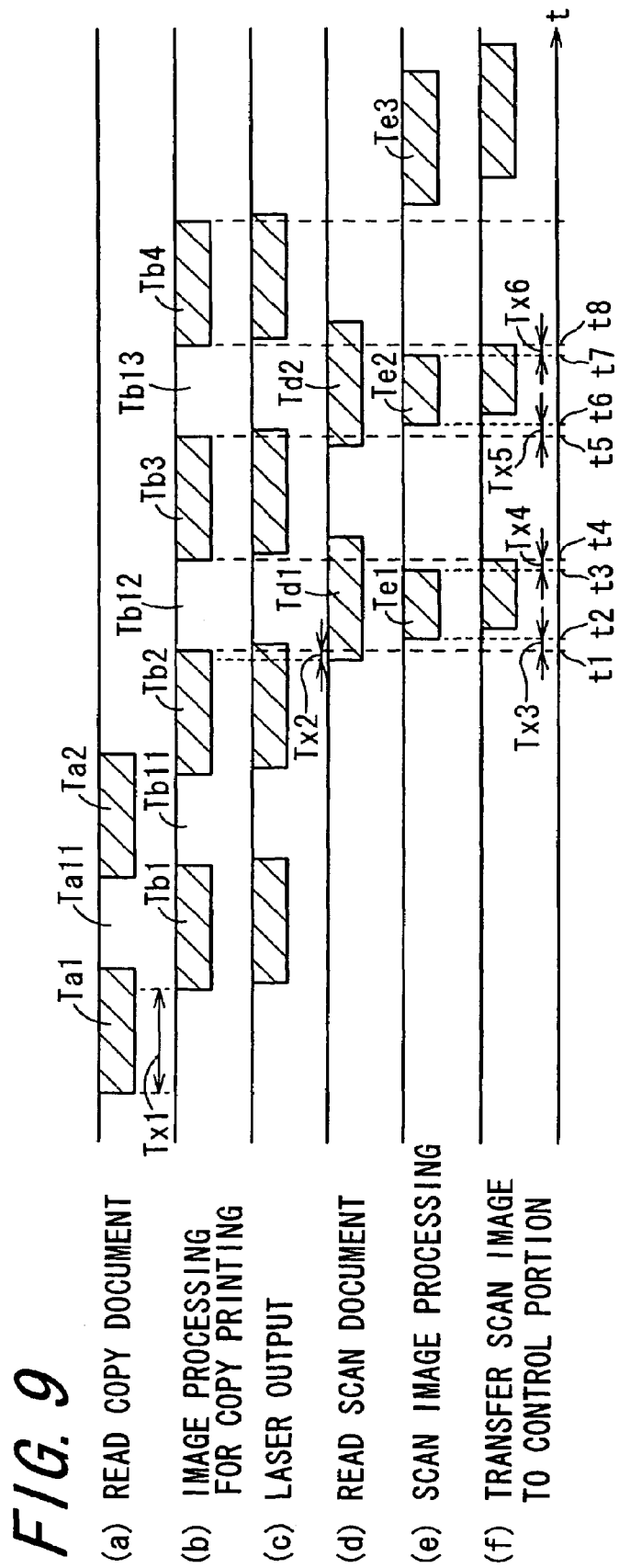

IMAGE FORMING APPARATUS

BACKGROUND OF THE INVENTION

1. Field of the Invention

The present invention relates to an image forming apparatus capable of, in parallel with printing of a set of image data, image-processing of another set of image data in an image processing portion.

2. Description of the Related Art

As a copying machine or the like, which is a kind of image forming apparatus, there is a so-called multi-access type that is capable of simultaneously executing print recording of a set of image data and reading of another set of image data. As the multi-access type of copying machine, because of a strong desire for increase of a processing speed, there is the one equipped with two image processing portions that are processing circuits so as to be capable of executing image processing for print recording of a set of image data and image processing of another set of image data having been read in parallel.

However, an image processing portion that executes high-grade image processing is expensive and hence causes a rise in cost of the apparatus. Therefore, such an image forming apparatus is demanded that is equipped with only one image processing portion to keep the cost low and processes at a high speed.

As means for increasing a processing speed in the multi-access type of image forming apparatus, use of a recording sheet interval formed by recording sheets when a plurality of recording sheets are subjected to print recording, that is, an interval between execution of one print recording job and execution of a next print recording job can be considered. As a prior art focusing on the recording sheet interval, there is an image forming apparatus capable of executing a plurality of jobs by interrupt, and the image forming apparatus detects a recording sheet interval while one job is in progress and executes a job not executed at present as an interrupt job in a case where the job may be executed within the recording sheet interval (refer to Japanese Unexamined Patent Publication JP-A 2004-173291).

However, JP-A 2004-173291 discloses only increase of processing efficiency by executing an interrupt print job in a recording sheet interval during execution of an ordinary print job, and does not disclose at all a solution to limit the number of the image processing portions to one and to execute print recording of a set of image data and image processing of another set of image data in parallel in order to reduce the cost and increase processing efficiency, in the multi-access type of image forming apparatus as described before.

SUMMARY OF THE INVENTION

An object of the invention is to provide an image forming apparatus capable of executing print recording of a set of image data and image processing of another set of image data in parallel with the print recording, and having only one image processing portion, but having high efficiency of image data processing.

The invention provides an image forming apparatus which executes image processing and print recording in such a manner that a first set of image data is image-processed, thereafter is print-recorded on a plurality of recording sheets and in parallel with the print recording of the first set of image data, a second set of image data is image-processed, the image forming apparatus comprising:

an image reading portion for reading image formed on a document;

an image processing portion for executing image processing of the image data;

a printing portion for executing print recording of the image data;

a recording sheet interval setting portion for setting a recording sheet interval of the recording sheets subjected to print recording of the first set of image data, which recording sheet interval is an interval between a position where print recording to a recording sheet ends and a position where print recording to a succeeding recording sheet starts;

an image dividing portion for preparing divided image data by dividing image data for one sheet of document of the second set of image data read by the image reading portion into a plurality divisions; and a control portion for controlling the operation of the image processing portion so that the divided image data is image-processed in the recording sheet interval.

According to the invention, the control portion provided in the image forming apparatus controls the operation of the image processing portion so that image data of the second set of image data for one sheet of document read by the image reading portion and divided into a plurality of divisions by the image dividing portion is image-processed, in the recording sheet interval of the recording sheets subjected to print recording of the first set of image data, which recording sheet interval is an interval between a position where print recording to a recording sheet ends and a position where print recording to a succeeding recording sheet starts. In this way, it is utilized that the image processing portion is not used for image processing of the first set of image data in the recording sheet intervals caused during a print recording process of the first set of image data. The second set of image data for one sheet of document read by the image reading portion is divided into a plurality divisions, and the divided image data is image-processed in the recording sheet intervals, so that it becomes possible to execute a plurality of jobs in parallel, namely a print job of print recording and a scan job of reading and processing an image, and processing efficiency increases.

Further, in the invention, it is preferable that the image dividing portion divides the image data of the second set of image data for one sheet of document so that each of boundary sections which are data start portions of the divisions has an overlapping portion of image data with a boundary section which is a data end portion of an immediately preceding division, and each of boundary sections which are data end portions of the divisions has an overlapping portion of image data with a boundary section which is a data start portion of an immediately following division.

According to the invention, the image dividing portion divides the second set of image data so that the boundary sections of divided image data have overlapping portions of image data with the boundary portions of front position divided image data and rear position divided image data located in front of and in rear of the divided image data, respectively. This makes it possible to execute image processing that needs successive image data in front and in rear, for example, a filter process, a scaling process and the like smoothly without hindrance.

Furthermore, in the invention, it is preferable that the image forming apparatus further comprises an image memory for storing the first set of image data ready for printing, wherein the image dividing portion divides the second set of image data so as to be divided into a number corresponding to the number of sheets ready for printing of the first set of image data stored in the image memory.

According to the invention, the image memory that stores the first set of image data waiting for printing is comprised, and the image dividing portion divides the second set of image data so as to be divided into a number corresponding to the number of sheets waiting for printing of the first-set of image data stored in the image memory. Consequently, the more the number of sheets waiting for printing of a print job in a status waiting for the print recording process is, the more the second set of image data can be divided into, so that it becomes possible to set a recording sheet interval small, and it is possible to quickly execute a job ready for printing in the accumulated state.

Still further, in the invention, it is preferable that the image forming apparatus further comprises a recording sheet interval regulating portion for regulating a recording sheet interval to set a regulated recording sheet interval to the recording sheet interval setting portion.

According to the invention, the recording sheet interval regulating portion for regulating a recording sheet interval to set a regulated recording sheet interval to the recording sheet interval setting portion is provided. Dividing the second set of image data in to equal divisions is the most efficient for image processing. Therefore, by regulating a recording sheet interval in the recording sheet interval regulating portion in accordance with a time necessary for image processing of the divided image data prepared by equally dividing the second set of image data, it is possible to increase the efficiency of image processing.

Still further, in the invention, it is preferable that the image forming apparatus further comprises a mode change over portion for making change over between an image processing priority mode in which the control portion controls the operation of the image processing portion so that an image processing time of the divided image data of the second set of image data becomes the shortest and a recording sheet interval minimization mode in which the control portion controls the operation of the recording sheet interval setting portion to minimize a conveyance interval of a plurality of recording sheets subjected to print recording of the first set of image data, wherein the paper interval regulating portion regulates a recording sheet interval in accordance with the output of the mode changeover portion.

According to the invention, the mode changeover portion switches between the image processing priority mode of making an image processing time of the divided image data of the second set of image data the shortest and the recording sheet interval minimization mode of minimizing a conveyance interval of a plurality of recording sheets subjected to print recording of the first set of image data, and the recording sheet interval regulating portion regulates a recording sheet interval in accordance with the output of the mode changeover portion. Consequently, it is possible to select and execute with priority in response to the request of the operator either image processing of the second set of image data in as short a time as possible or the print recording process of the first set of image data as quickly as possible.

Still further, in the invention, it is preferable that the image processing portion has a first register for holding an operation setting relating to image processing of the second set of image data and a second register for holding an operation setting relating to print recording of the first set of image data, and changeover between the first register and the second register is carried out in accordance with the beginning and end of the recording sheet interval.

According to the invention, the image processing portion has the first register that holds an operation setting relating to image processing of the second set of image data and the second register that holds an operation setting relating to print recording of the first set of image data, and changeover between the first register and the second register is carried out in accordance with the beginning and end of the recording sheet interval. By thus providing two registers and changing over the registers in accordance with the modes, it is possible to shorten a time required for changing over the modes, so that it becomes possible to make an effective time of a recording sheet interval longer.

BRIEF DESCRIPTION OF THE DRAWINGS

Other and further objects, features, and advantages of the invention will be more explicit from the following detailed description taken with reference to the drawings wherein:

FIG. 6B is a flowchart describing an operation in the case of changing the number of processing lines in a recording sheet interval in accordance with the number of sheets to print the first set of image data

FIG. 7A is a view exemplifying table data 1A;
FIG. 7B is a view exemplifying table data 1B;
FIG. 7C is a view exemplifying table data 1C;
FIG. 7D is a view exemplifying table data 1D;
FIG. 8A is a view exemplifying table data 2A;
FIG. 8B is a view exemplifying table data 2B;
FIG. 8C is a view exemplifying table data 2C;
FIG. 8D is a view exemplifying table data 2D; and
FIG. 9 is a timing chart showing a concrete example of a case of executing a printing process of the first set of image data and image processing of the second set of image data in parallel with each other.

DETAILED DESCRIPTION

Figure 1:
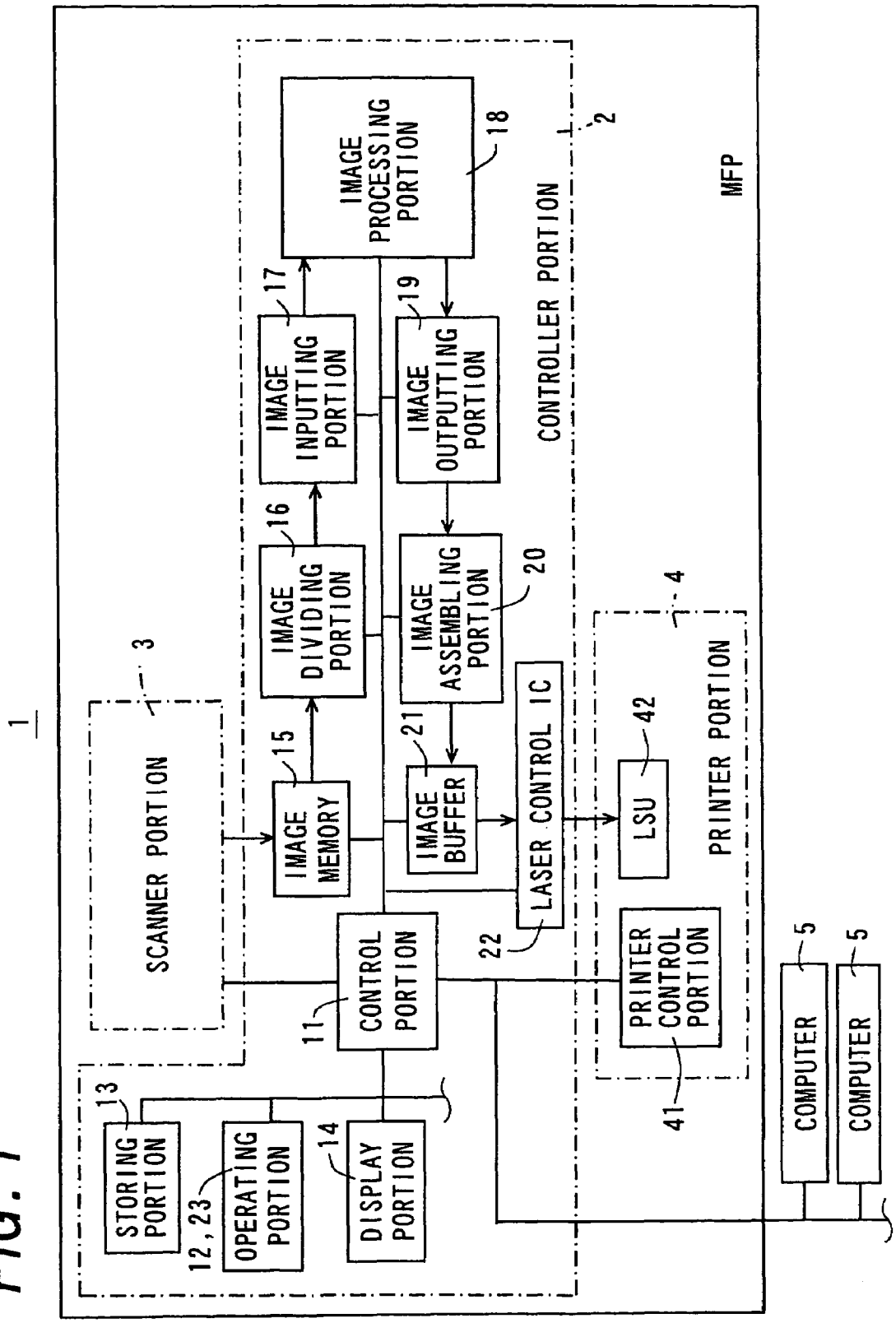
FIG. 1 is a block diagram showing a simplified electrical configuration of an image forming apparatus as an embodiment of the invention.

Now referring to the drawings, preferred embodiments of the invention are described below.

FIG. 1 is a block diagram showing a simplified electrical configuration of an image forming apparatus 1 as an embodiment of the invention. The image forming apparatus 1 shown in FIG. 1 is, for example, a multifunction system that has both a function of a printer connected to a computer 5 and executing image formation based on image data inputted from the computer 5 and a function of a copying machine copying image formed on a document.

The image forming apparatus 1 generally comprises a controller portion 2, a scanner portion 3, and a printer portion 4 as a printing portion.

The scanner portion 3 forms an image reading portion that includes an original mounting table on which a document with an image formed in advance is placed and an optical scanning portion optically scanning the image of the document placed on the original mounting table and reading image. The image data of the document read by the scanner portion 3 is stored in an image memory 15 provided in the controller portion 2.

The controller portion 2 includes: a control portion 11; an operating portion 12, a storing portion 13 and a display portion 14 that are connected to the control portion 11, respectively; and the image memory 15, an image dividing portion 16, an image inputting portion 17, an image processing portion 18, an image outputting portion 19, an image assembling portion 20, an image buffer 21 and a laser control integrated circuit (laser control IC) 22 that are also connected to the control portion 11.

The control portion 11 is a processing circuit that has a central processing unit (CPU), for example. The control portion 11 controls the overall operation of the image forming apparatus 1, and also controls the operations of the respective portions connected to the control portion 11.

The storing portion 13 is formed by, for example, a read only memory (ROM), a random access memory (RAM) a nonvolatile memory or the like, and stores a program for causing the control portion 11 to control the operation of the image forming apparatus 1, table data used for setting the number of processing lines in a recording sheet interval described later, and so on.

The operating portion 12 is also an inputting portion by which the operator of the image forming apparatus 1 inputs operation commands, operation conditions or the like, and is provided with, for example, a keyboard, inputting buttons set so as to be capable of inputting the respective operation commands, and so on. What should be noted in the present embodiment in particular is that the operating portion 12 is provided with a mode selection switch that is a mode changeover portion that switches between an image processing priority mode and a recording sheet interval minimization mode described later.

Figure 2:
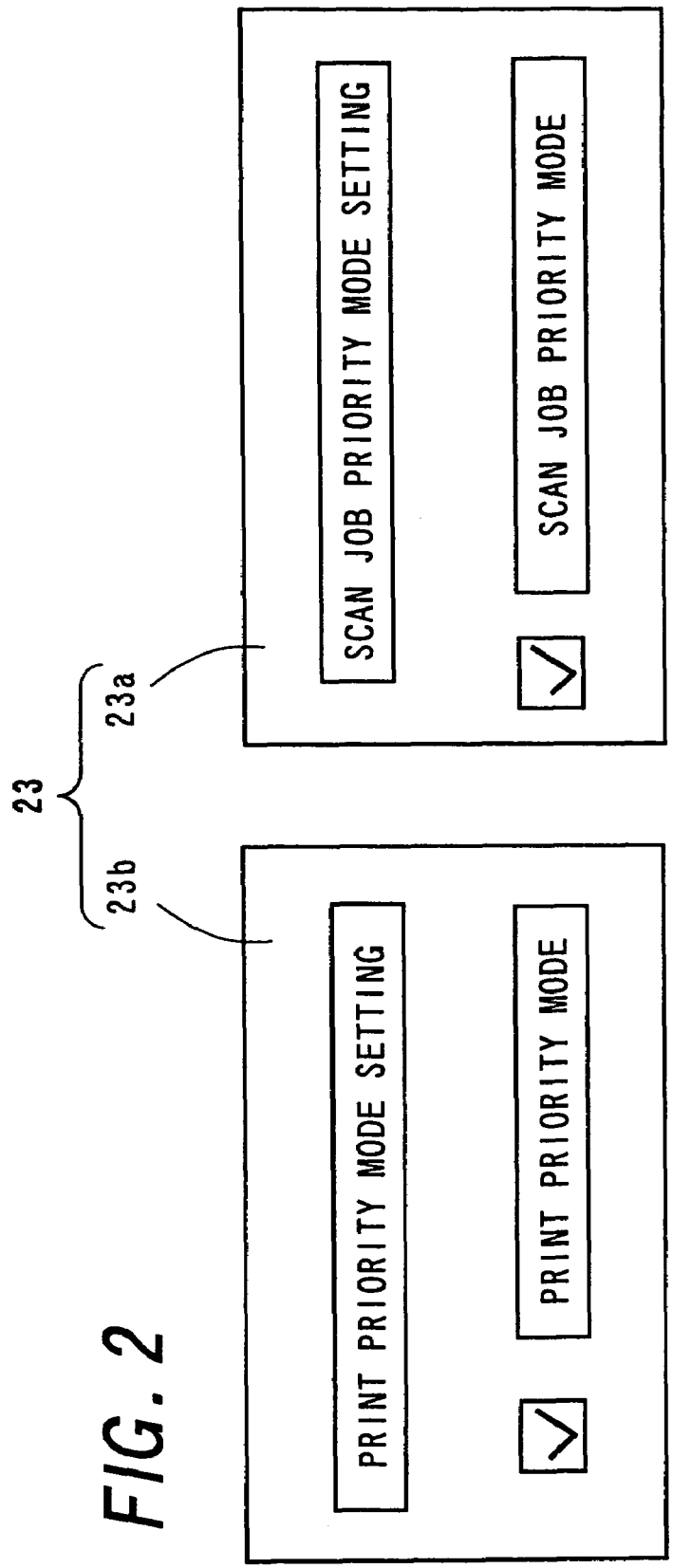
FIG. 2 is a view showing a mode selection switch provided in the operating portion.

FIG. 2 is a view showing a mode selection switch 23 provided in the operating portion 12. The mode selection switch 23 is provided, for example, as a touch panel switch in the operating portion 12, and has a "scan job priority mode setting" portion 23a that commands the image processing priority mode and a "print priority mode setting" portion 23b that commands the recording sheet interval minimization mode. When the operator selects and touches either the "scan job priority mode setting" portion 23a or the "print priority mode setting" portion 23b, the operation command of the selected one is inputted to the control portion 11, and the selected portion is indicated by a check mark. The operation of the control portion 11 when the output of the mode selection switch 23 is given thereto will be described later.

Referring to FIG. 1 again, the display portion 14 is formed by, for example, a liquid crystal display (LCD) or the like. On the display portion 14, the aforementioned mode selection indication, the number of recording sheets that should be subjected to print recording, and the like are displayed in response to the display operation commands of the control portion 11.

Figure 3:
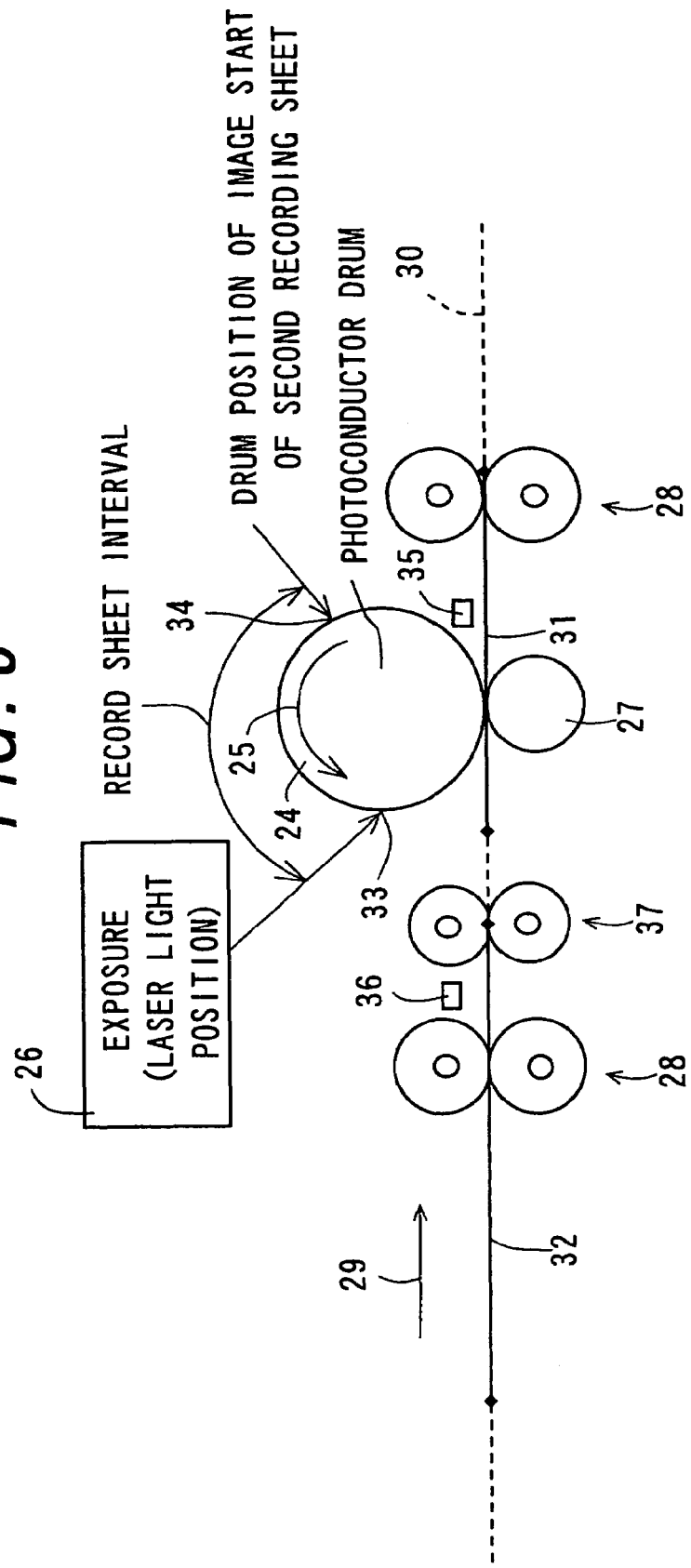
FIG. 3 is a view showing a simplified mechanical configuration around a photoconductor drum of the image forming apparatus.

A recording sheet interval will be described now before describing the remaining portions of the controller portion 2. FIG. 3 is a view showing a simplified mechanical configuration around a photoconductor drum 24 of the image forming apparatus 1. Around the photoconductor drum 24 included in the printing portion of the image forming apparatus 1, in order from the upstream side to the downstream side in the rotation direction shown by arrow 25, a charging device (not shown), an exposure portion 26, a developing device (not shown) and a transfer roller 27 are provided. The charging device uniformly charges the photoconductor drum 24. The exposure portion 26 exposes the uniformly charged photoconductor drum 24 with light corresponding to image data, for example, a laser light, and forms an electrostatic latent image on the surface of the photoconductor drum 24. The developing device supplies a developer to the surface of the photoconductor drum 24 to develop the electrostatic latent image and form a toner image. The transfer roller 27 applies reverse bias to that of the photoconductor drum 24 and transfers the toner image formed on the photoconductor drum 24 onto a recording sheet. A recording sheet on which a toner image is transferred and a recording sheet after recording are conveyed in the direction of arrow 29 by a plurality of pairs of conveying rollers 28 provided on a conveying path 30.

A recording sheet interval is an interval formed by recording sheets subjected to print recording of first set of image data, and defined as an interval between a position where print recording to a first recording sheet 31 ends and a position where print recording to a succeeding second recording sheet 32 starts. To be exact, the recording sheet interval is set not on the conveying path 30 of the first and second recording sheets 31 and 32 but on the photoconductor drum 24. That is to say, the recording sheet interval is a distance, in the perimeter direction of the photoconductor drum 24, between a position, that is a laser light position 33 to write by the exposure portion 26 the image data of an electrostatic latent image that should be formed as an image on the first recording sheet 31, and a position that is an image starting drum position of the second recording sheet 34 in which the rotation direction 25 is on the upstream side with respect to the position 33, reaches the position 33 in accordance with a rotation of the photoconductor drum 24 and starts writing by the exposure portion 26 the initial image data of an electrostatic latent image in order to form an image onto the second recording sheet 32, and the recording sheet interval as a time is a value obtained by dividing the distance by the rotation speed of the photoconductor drum 24.

Timing regulation is performed so that a conveyance interval between the first recording sheet 31 and the second recording sheet 32 on the conveying path 30 coincides with a recording sheet interval set on the photoconductor drum 24. The timing regulation is performed in the following manner. Along the conveying path 30, two detecting sensors, namely, first and second detecting sensors 35 and 36 for detecting recording sheets are provided at a predetermined interval. The conveying speeds of recording sheets detected by the first and second detecting sensors 35 and 36, and the detection result of the head of the second recording sheet 32 detected by the second detecting sensor 36 are inputted to the control portion 11, and the control portion 11 outputs an operation command to a driving system of the conveying rollers 28 and also outputs an operation command to a driving system of a resist roller 37, thereby controlling so that an image formation start position on the second recording sheet 32 and an image writing start position 34 on the photoconductor drum 24 coincide with each other.

Accordingly, the control portion 11 that controls a position to form an electrostatic latent image onto the photoconductor drum 24 by the exposure portion 26 as one part of the overall operation control of the image forming apparatus 1 is recording sheet interval setting portion. Moreover, the first and second detecting sensors 35 and 36 that regulate so that the conveying interval of a plurality of recording sheets actually conveyed to the printing portion coincides with a recording sheet interval set on the photoconductor drum 24, the conveying rollers 28, the driving system thereof, the resist roller 37 and the driving system thereof form recording sheet interval regulating portion together with the control portion 11.

Referring to FIG. 1 again, the configuration of the image forming apparatus 1 will be described.

The image memory 15 is a storing portion and formed by, for example, a RAM or the like. In the image memory 15, image data of a document read by the scanner portion 3 is stored. Moreover, in the image memory 15, first set of image data as image data that print recording is about to be executed and the number of sheets waiting for printing as the number of recording sheets that should be subjected to print recording are stored.

The image dividing portion 16 is a processing circuit that subjects image data of the second set of image data different from the first set of image data subjected to print recording, the second set of image data being read by the scanner portion 3 and stored in the image memory 15, to an image dividing process described below, in response to an operation command from the control portion 11 based on the operation program.

The image dividing portion 16 prepares divided image data by dividing the image data for one sheet of document of the second set of image data read out of the image memory 15, into a plurality of divisions. In dividing the image data for one sheet of document of the second set of image data, the image dividing portion 16 divides so that each of boundary sections which are data start portions of the divisions has an overlapping portion of image data with a boundary section which is a data end portion of an immediately preceding division, and each of boundary sections which are data end portions of the divisions has an overlapping portion of image data with a boundary section which is a data start portion of an immediately following division.

Figure 4:
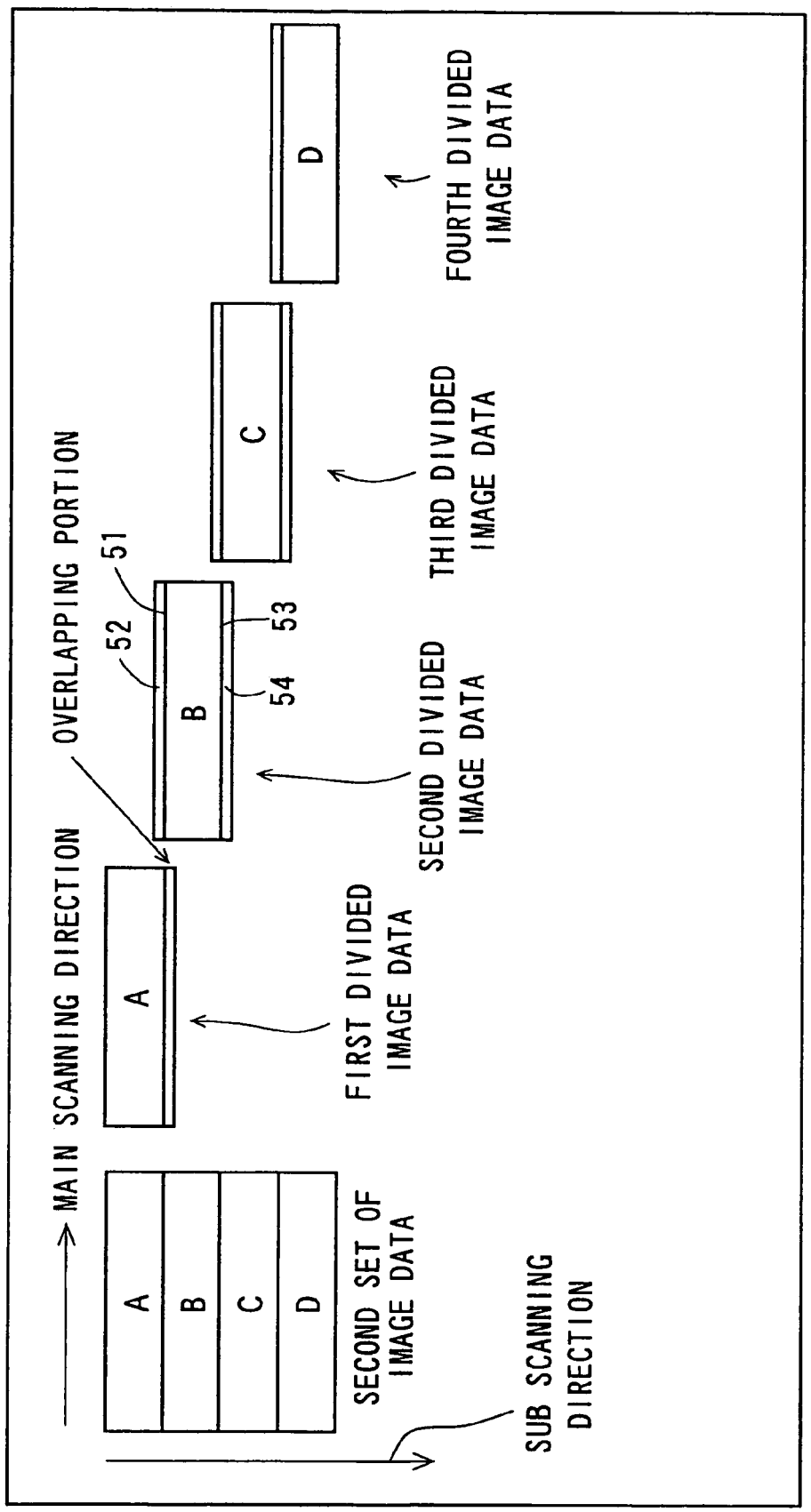
FIG. 4 is a view describing the overview of division of image data of a second set of image data by the image dividing portion.

FIG. 4 is a view describing the overview of division of image data of a second set of image data by the image dividing portion 16. Referring to FIG. 4, division of image data of a second set of image data will be described below. FIG. 4 exemplifies a case where the image dividing portion 16 equally divides image data of a second set of image data that should be subjected to image formation on one recording sheet into four in parallel to a main scanning direction, that is, equally divides into first to fourth divided image data A, B, C and D. The image dividing portion 16 divides image data of the second set of image data so that, taking up the second divided image data B, an overlapping portion 52 of image data with the first divided image data A is formed at a data start portion 51 of the second divided image data B, which is a boundary portion between the first divided image data A as front position divided image data and the second divided image data B, and so that an overlapping portion 54 of image data with the third divided image data C is formed at a data end portion 53 of the second divided image data B, which is a boundary portion between the third divided image data C as rear position divided image data and the second divided image data B.

The remaining divided image data other than the second divided image data are also divided so as to have image data portions overlapping with divided image data in front and in rear in the same manner as the second divided image data. However, at the data start portion and the data end portion of the entire second set of image data, overlapping portions of image data are not formed.

Division of image data of the second set of image data by the image dividing portion 16 differs between the two processing modes as described before. In a case where the recording sheet interval minimization mode (may be referred to as the print priority mode) is selected, the distance of a recording sheet interval is set to the minimum recording sheet interval distance (40 mm in concrete) determined by structural restrictions (variations in paper sheet conveying speed, and the like), and the recording sheet interval distance is the same regardless of whether to execute image processing within the recording sheet interval. In the recording sheet interval minimization mode, the number of lines that can be subjected to image processing within a time of the recording sheet interval is set. Consequently, regardless of whether to execute image processing within the recording sheet interval, a printing speed does not decrease. In this case, image data is not equally divided.

On the other hand, in the image processing priority mode (may be referred to as the scan job priority mode), efficient image processing in recording sheet intervals is prior even if a recording sheet interval distance gets longer. In concrete, the number of all lines of one sheet of processing object image is equally divided, and the obtained number is set as the number of processing lines within one recording sheet interval. Consequently, the processing is executed equally and efficiently without a fraction in the number of processing lines in each recording sheet interval.

Further, it is also possible to change the number of processing lines in a recording sheet interval in accordance with the number of pages waiting for printing of first set of image data. In this case, the number of processing lines in a recording sheet interval is increased (the number of divisions is decreased) when the number of pages waiting for printing is small, whereas the number of processing lines in a recording sheet interval is decreased (the number of divisions is increased) when the number of pages waiting for printing is large. Consequently, when the number of pages waiting for printing is small, a printing process time of the first image is short originally, and hence the total time is short even if a recording sheet interval gets longer somewhat, so that it is possible to make a waiting time of the user waiting for printing of the first image short and make image processing of the second image speedy. On the other hand, since a recording sheet interval is shortened when the number of pages waiting for printing is large, it is possible to effectively use the recording sheet intervals in printing of a large number of pages, and a waiting time of the user waiting for printing of the first image does not get longer.

Which of the recording sheet interval minimization mode and the image processing priority mode to set as the operation mode is selected and directed by an operator's operation of the mode selection switch 23 provided in the operating portion 12 serving as the inputting portion as described before. In response to an output from the mode selection switch 23 and the number of sheets waiting for printing inputted by the operator also from the operating portion 12, the control portion 11 selects table data described later that is predetermined corresponding to the operation mode, the number of sheets waiting for printing and the size of recording sheets and that is stored in the storing portion 13, and determines the number of processing lines of the second set of image data in accordance with the table data. The size of recording sheets is detected at the same time as image data of a document is read by the scanner portion 3, independently of an operation from the operating portion 12, and the detection signal is inputted to the control portion 11.

Referring to FIG. 1 again, the image data of the second set of image data divided by the image dividing portion 16 is outputted to the image processing portion 18 by the operation of the image inputting portion 17.

In accordance with an operation command by the control portion 11, the image processing portion 18 image-processes the image data of the second set of image data divided by the image dividing portion 16 into a plurality of divisions, in recording sheet intervals of recording sheets on which the first set of image data is print-recorded. Image processing is, for example, a gamma correction process, a filter process, a scaling process and the like.

Figure 5:
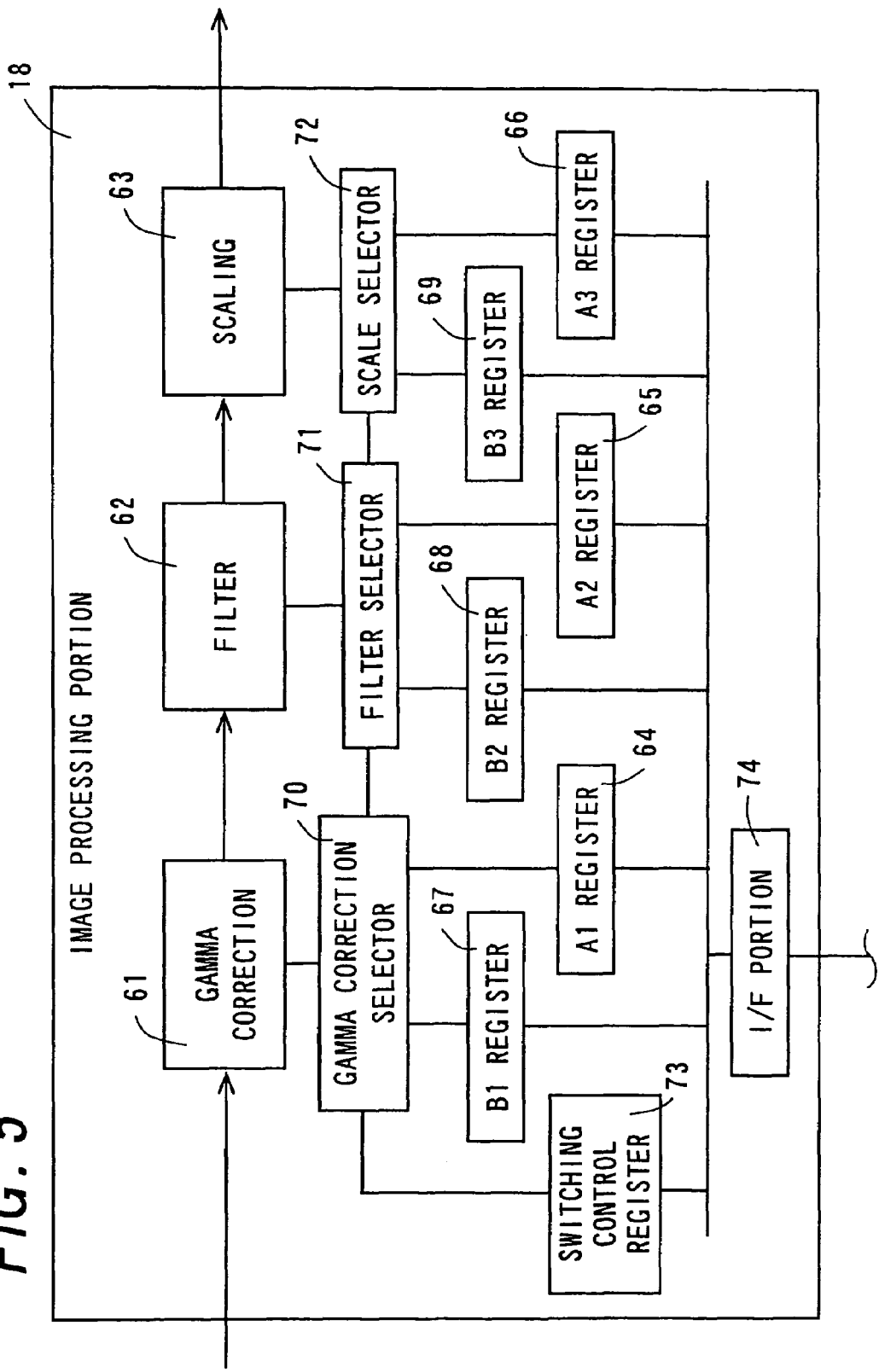
FIG. 5 is a block diagram showing the configuration of the image processing portion.

FIG. 5 is a block diagram showing the configuration of the image processing portion 18. The image processing portion 18 is provided with a gamma correction portion 61, a filter portion 62, scaling portion 63, A1 register 64, A2 register 65, A3 register 66, B1 register 67, B2 register 68, B3 registers 69, a gamma correction selector 70, a filter selector 71, a scale selector 72, a changeover control register 73, and an interface (I/F) portion 74. The gamma correction portion 61 executes a gamma correction process. The filter portion 62 executes a filter process. The scaling portion 63 executes a scaling process. A1 register 64, A2 register 65 and A3 register 66 serve as a group of registers forming a first register that holds operation settings relating to an image processing operation. B1 register 67, B2 register 68, B3 registers 69 serve as a group of registers forming a second register that holds operation settings relating to image processing for a print recording operation. The interface (I/F) portion 74 serves as a connecting portion with an external apparatus of the image processing portion 18.

Gamma tables used for the gamma correction process, filter factors used for the filter process and scaling ratios used for the scaling process are different in setting contents between image processing of image data and image processing for print recording to execute image forming. In the present embodiment, the A1 register 64, A2 register 65 and A3 register 66 forming the first register and the B1 register 67, B2 register 68, B3 registers 69 forming the second register hold gamma tables, filter factors and scaling ratios relating to the image processing operation and the print recording operation, respectively, as shown in Table 1.

TABLE 1

| Process | Contents of register | Image processing operation | Print recording operation |
| --- | --- | --- | --- |
| Gamma correction process | Gamma table | A1 register | B1 register |
| Filter process | Filter factor | A2 register | B2 register |
| Scaling process | Scaling ratio | A3 register | B3 register |

The gamma correction selector 70 is interposed between the A1, B1 registers 64, 67 and the gamma correction portion 61 and connected to both, and switches to output one of the gamma tables relating to the respective operations held by the A1 register 64 and the B1 register 67 to the gamma correction portion 61. The filter selector 71 is interposed between the A2, B2 registers 65, 68 and the filter portion 62 and connected to both, and switches to output one of the filter factors relating to the respective operations held by the A2 register 65 and the B2 register 68 to the filter portion 62. The scale selector 72 is interposed between the A3, B3 registers 66, 69 and the scaling portion 63 and connected to both, and switches to output one of the scaling ratios relating to the respective operations held by the A3 register 66 and the B3 register 69 to the scaling portion 63.

The changeover control register 73 is connected to the gamma correction selector 70, the filter selector 71 and the scale selector 72. The changeover control register 73 responds to either an operation command to execute print recording of first set of image data or an operation command to execute image processing of second set of image data that are given from the control portion 11 via the I/F portion 74, and controls the changeover operations of the gamma correction selector 70, the filter selector 71 and the scale selector 72. When the changeover control register 73 causes the respective selectors 70 to 72 to execute changeover operations, the settings shown in Table 1 relating to the respective operations are given to the gamma correction portion 61, the filter portion 62 and the scaling portion 63 from either the first group of registers 64 to 66 holding the settings of the image processing operation or the second group of registers 67 to 69 holding the settings of the print recording operation.

At the time of execution of image processing of the second set of image data in a recording sheet interval between recording sheets for executing print recording of the first set of image data to a plurality of recording sheets, all of the time of the recording sheet interval cannot be used for image processing. Since the settings of the used gamma tables and so on are different between print recording and image processing as described before, a time for changing over the settings from print recording to image processing and a time for changing over the settings from image processing to print recording are necessary in the recording sheet interval. The difference between the time of the recording sheet interval and the changeover times is a recording sheet interval effective time that can be used for image processing.

Although a long time is required in a case where changeover of the settings is executed in the form of rewriting by the control portion 11 for every changeover, it is possible to remarkably shorten a time required for changing over the settings by providing the registers that hold the settings relating to the image processing operation and the print recording operation, respectively, and changing over the settings held by the respective registers in unison.

Since this makes it possible to shorten a recording sheet interval time while maintaining an effective time that can be used for image processing in a recording sheet interval, it is possible to increase processing efficiency. On the contrary, in a case where the length of a recording sheet interval time does not change, it is possible to make the effective time longer, so that it becomes possible to execute image processing of more image data.

Referring to FIG. 1 again, the divided image data subjected to image processing in the image processing portion 18 are outputted to the image assembling portion 20 by the operation of the image outputting portion 19. The image assembling portion 20 is a processing circuit that assembles the divided image data of the second set of image data divided in the image dividing portion 16 and subjected to image processing in the image processing portion 18, into one recording sheet of image data again. The second set of image data assembled into one recording sheet of data in the image assembling portion 20 is inputted from the image assembling portion 20 to the image buffer 21 serving as a memory, and stored therein. The second set of image data temporarily stored in the image buffer 21 is, at the time of print recording of the second set of image data, read out of the image buffer 21 by the control portion 11, and sent to the printer portion 4 by the laser control IC 22 that operates in response to an operation command also from the control portion 11.

The printer portion 4 of the image forming apparatus 1 includes a printer control portion 41, and a laser writing control portion 42. The laser writing control portion 42 executes operation control for image formation onto the photoconductor drum 24, such as charging control of the photoconductor drum 24, control of writing of an electrostatic latent image by the exposure portion, and control relating to development of an electrostatic latent image. The printer control portion 41 executes control of operations such as transfer of an image formed on the photoconductor drum 24 to a recording sheet and fixing of an image transferred to a recording sheet, based on the operation commands of the control portion 11. The printer portion 4 charges the photoconductor drum 24 to a uniform potential, exposes the photoconductor drum 24 with light corresponding to image data sent from the controller portion 2 to form an electrostatic latent image, develops the electrostatic latent image to make the image visible as a toner image, and transfers the toner image to a recording sheet to fix thereon. In other words, the printer portion 4 is a printing portion (printing operation executing portion).

Figure 6A:
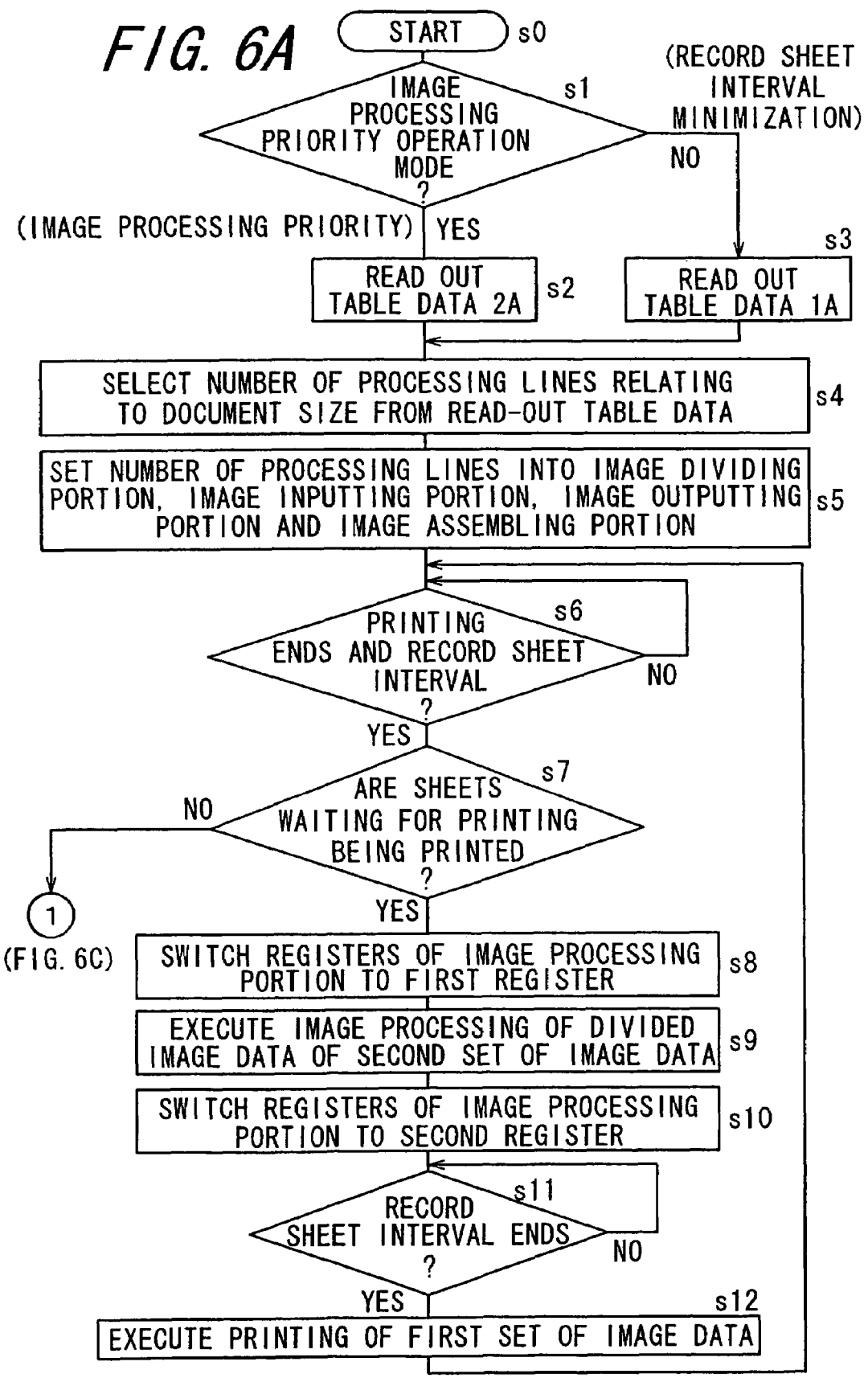
FIG. 6A is a flowchart describing an operation in the case of executing a printing process of first set of image data and image processing of second set of image data in parallel.

Next, an operation in the case of executing a printing process of first set of image data and image processing of second set of image data in the image forming apparatus 1 of the present embodiment will be described. FIG. 6A is a flowchart describing an operation in the case of executing a printing process of first set of image data and image processing of second set of image data in parallel.

The start at step s0 is a state where an operation power source of the image forming apparatus 1 has been turned on to be ready for working and the operator has operated the mode selection switch 23 provided in the operating portion 12 to select either the image processing priority mode (scan job priority mode) 23a or the recording sheet interval minimization mode (print priority mode) 23b.

At step s1, the control portion 11 determines whether an output from the mode selection switch 23 is the image processing priority mode or not. The operation moves to step s2 when the mode is the image processing priority mode, and moves to step s3 when the mode is the recording sheet interval minimization mode.

When the mode is the recording sheet interval minimization mode and the operation moves to step s3, table data 1A shown in FIG. 7A is read out of the storing portion 13 at step s3. The table data 1A is data showing the relation between the number of processing lines and the size of documents previously created to use in the recording sheet interval minimization mode. Since a recording sheet interval time, more exactly, a recording sheet interval effective time excluding a time required for changing over the registers corresponds to the number of processing lines that can be subjected to image processing within the time, the recording sheet interval time is represented by the number of processing lines in the table data. The table data 1A is used for giving priority to the print recording operation by minimizing a recording sheet interval in which print recording of first set of image data is executed.

On the other hand, when the mode is the image processing priority mode and the operation moves to step s2, table data 2A shown in FIG. 8A is readout of the storing portion 13 at step s2. The table data 2A is data showing the relation between the number of processing lines and the size of documents previously created to use in the image processing priority mode. The table data 2A is used for executing image processing of second set of image data with efficiency by setting to one half the number of lines of one sheet of image data (e.g. the number of lines of one sheet is 4960 in a case where the document size is A4). The recording sheet interval recording sheet interval regulating portion regulates a recording sheet interval in which print recording of first set of image data is executed, based on the table data 2A, so that a desired recording sheet interval time is obtained, and the image processing priority process is realized.

At step s4, the number of processing lines relating to the document size is selected from the read-out table data. At step s5, the selected number of processing lines is set into the image dividing portion 16, the image inputting portion 17, the image outputting portion 19, and the image assembling portion 20.

At step s6, it is determined whether or not the print recording operation of first set of image data has ended and it is a recording sheet interval. The operation moves to step s7 when the print recording operation has ended, and the determining operation at step s6 is repeated when the print recording operation has not ended.

At step s7, it is determined whether or not printing of the number of sheets waiting for printing of the first set of image data is being executed. This determination contains two determinations, whether or not printing of the number of sheets waiting for printing has been completed and whether or not printing has been interrupted due to a paper jam or the like. The determination whether or not printing of the number of sheets waiting for printing has been completed can be executed by detecting, for every printed image data, printed recording sheets by the first detecting sensor placed on the exit side of the photoconductor drum 24 and accumulating the detection results to compare with the number of sheets waiting for printing inputted from the operating portion 12. The operation moves to step s13 of FIG. 6C when printing of all the number of sheets waiting for printing is completed, and moves to step s8 when not completed.

The determination whether or not printing has been interrupted due to a paper jam or the like is executed, for example, by determination by the printer control portion 41 that a recording sheet has not reached a specified point within a specified time, based on the detection result of the recording sheet detecting sensor. When printing is interrupted, the operation moves to step s13 of FIG. 6C.

At step s8, by controlling the operations of the respective selectors 70, 71 and 72 via the changeover control register 73, the registers of the image processing portion 18 are switched to the first group of registers 64 to 66. At step s9, image processing of the divided image data of the second set of image data is executed in a recording sheet interval.

At step s10, image processing of the number of processing lines based on the table data is finished, and by controlling the operations of the respective selectors 70, 71 and 72 via the changeover control register 73, the registers of the image processing portion 18 are switched to the second group of registers 67 to 69.

At step s11, it is determined whether the recording sheet interval has ended or not. Step s11 is repeated when the recording sheet interval has not ended, and the operation moves to step s12 and printing of the first set of image data is executed when a recording sheet interval has ended. After step s12, the operation moves back to step s6, and the steps from step s6 are repeated.

Figure 6C:
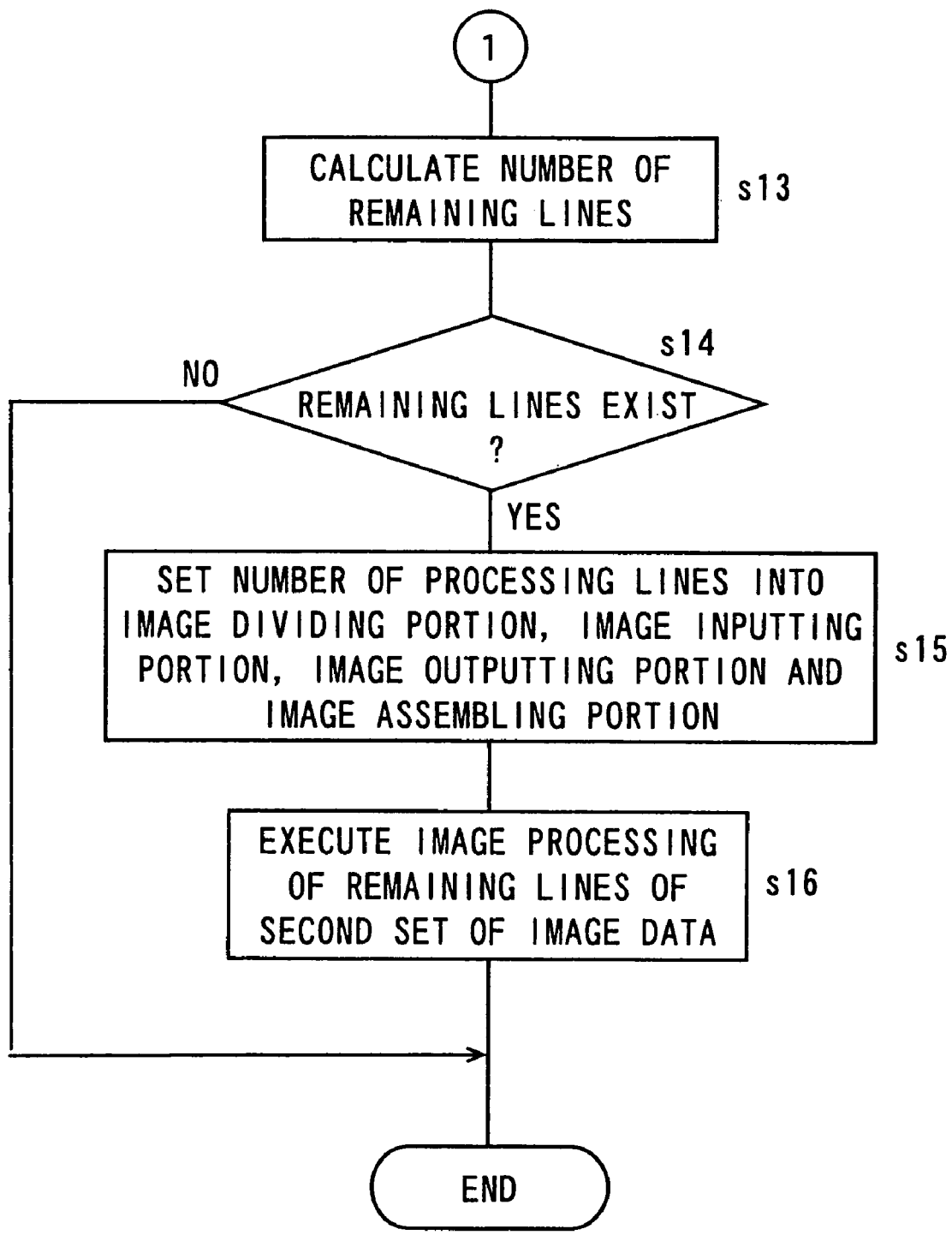
FIG. 6C is a flowchart describing an operation of processing remaining lines that are not processed within recording sheet intervals of the second set of image data.

Next, a flowchart shown in FIG. 6C will be described. In this flow, in a case where printing of the first set of image data is completed, or interrupted due to a jam or the like, processing of the number of remaining lines of the image data of the second set of image data that has not been processed within a recording sheet interval is executed.

At step s13, the number of remaining lines that have not been processed is calculated. The number of remaining lines is calculated by the expression (1). In the expression (1), the number of lines that have been processed is the product of the number of processing lines in a recording sheet interval and the number of recording sheet intervals (number of processed lines=number of recording sheet interval processing lines× number of recording sheet intervals).

(Number of remaining lines)=(number of all lines of second set of image data)−(number of processed lines)         (1)

At step s14, it is determined whether there is a remaining line or not, and in a case where there is a remaining line, the operation moves to step s15, and the number of processing lines is set into the image dividing portion 16, the image inputting portion 17, the image outputting portion 19 and the image assembling portion 20. In a case where there is no remaining line, the operation moves to the end, and the processing is completed. At step s16, image processing of the remaining line is executed. Processing of the second set of image data is completed then.

Next, an operation in the case of executing a printing process of first set of image data and image processing of second set of image data will be described referring to FIG. 6B. FIG. 6B is a flowchart describing an operation in the case of changing the number of processing lines in a recording sheet interval in accordance with the number of sheets to print the first set of image data.

Steps a0 and a1 are identical to steps s0 and s1 of FIG. 6A described before, and the description will be omitted.

When the operation mode is the recording sheet interval minimization mode and the operation moves to step a3, table data 1B shown in FIG. 7B is read out of the storing portion 13 at step a3. The table data 1B is data showing the relation among the number of sheets (the number of pages) waiting for printing, a recording sheet interval time and the size of documents previously created to use in the recording sheet interval minimization mode. Since a recording sheet interval time, more exactly, a recording sheet interval effective time excluding a time required for changing over the registers corresponds to the number of processing lines that can be subjected to image processing within the time, the recording sheet interval time is represented by the number of processing lines in the table data.

In a case where the number of remaining pages to print is 10 or more, the number of processing lines 1131 equivalent to the minimum recording sheet interval is set, but in a case where the number of remaining pages is smaller, the recording sheet interval time is elongated, and the speed of image processing of the second set of image data is increased.

On the other hand, when the operation mode is the image processing priority mode and the operation moves to step a2, table data 2B shown in FIG. 8B is read out of the storing portion 13 at step a2. The table data 2B is data showing the relation among the number of sheets waiting for printing, a recording sheet interval time and the size of documents previously created to use in the image processing priority mode. The recording sheet interval regulating portion regulates a recording sheet interval in which print recording of the first set of image data is executed, based on the table data 2B, so that a desired recording sheet interval time is obtained, and the image processing priority process is realized.

In a case where the number of pages waiting for printing is 10 or more, a recording sheet interval is shortened by setting the number of processing lines to one quarter the number of all lines of one sheet of document, but in a case where the number of pages waiting for printing is less than 10, the number of processing lines is set to one half the number of all lines of one sheet of document to increase the speed of image processing of the second set of image data.

At step a4, the number of processing lines relating to the document size is selected from the read-out table data. At step a5, the selected number of processing lines is set into the image dividing portion 16, the image inputting portion 17, the image outputting portion 19 and the image assembling portion 20. The operation at step a6 and later is the same as in the flow shown in FIG. 6A described before, and the description will be omitted.

Here is still another example. In FIGS. 7A, 7B, 8A and 8B, the number of processing lines in the minimum recording sheet interval is 1131, which is on the assumption that the paper size of printing sheets is A4. Then, the minimum recording sheet interval distance is 40 mm as described before.

A variety of printable paper sizes are prepared, and a recording sheet interval distance is changed in accordance with the size of printing sheets. For example, in a case where the paper size of printing sheets is larger than A4 (e.g. B4 size, A3 size), the minimum recording sheet interval distance is set larger than in the case of A4 in order to leave a margin for a recording sheet interval (e.g. 80 mm).

In a case where the paper size of printing sheets is larger than A4, instead of the aforementioned tables shown in FIGS. 7A, 7B, 8A and 8B: a table shown in FIG. 7C is used in a case where recording sheet interval minimization is selected and the number of lines is fixed; a table shown in FIG. 7D is used in a case where recording sheet interval minimization is selected and the number of lines is variable; a table shown in FIG. 8C is used in a case where image processing priority is selected and the number of lines is fixed; and a table shown in FIG. 8D is used in a case where image processing priority is selected and the number of lines is variable. Actual control is as shown in FIGS. 6A and 6b described before, and hence no mention will be made here.

FIG. 9 is a timing chart showing a concrete example of a case of executing a printing process of the first set of image data and image processing of the second set of image data in parallel.

FIG. 9 exemplifies a case of executing image processing by preparing two sheets of first and second copy documents as first set of image data that should be subjected to a printing process, executing the printing process of the respective copy documents on a two-by-two basis, namely, four sheets in total, and reading two sheets of first and second scan documents as second set of image data in recording sheet intervals in which the printing process of the four sheets is executed. In FIG. 9, a hatched part represents that an operation is being executed.

(a) of FIG. 9 shows a state in which the two sheets of first and second copy documents are read as the first set of image data in the scanner portion 3. The first copy document and the second copy document as the first set of image data are read at a time interval Ta11 by taking a time Ta1 and a time Ta2, respectively, in the scanner portion 3.

In (b) of FIG. 9, image data of the first and second copy documents as the first set of image data having been read is subjected to image processing for print recording in the image processing portion 18. Since the first and second copy documents are subjected to print recording on the two-by-two basis, image processing for print recording of the first set of image data is executed four times with a delay time Tx1 from reading of the copy documents, by taking times Tb1, Tb2, Tb3 and Tb4, respectively, in the image processing portion 18, and three time intervals Tb11, Tb12 and Tb13 are generated by the four image processing times for print recording.

The first set of image data having been subjected to image processing for print recording is sent to the printer portion 4 via the laser control IC 22, and outputted by laser at the exposure portion of the printer portion 4. (c) of FIG. 9 shows timing of laser output, and laser output is repeatedly executed four times with a little delay time (a delay of a time required for image processing and transmission to the printer portion 4 via the laser control IC 22) from timing of image processing for print recording.

Since a recording sheet interval time is a time between the end of laser output of the first set of image data and the beginning of laser output of the first set of image data that should be printed next on the photoconductor drum 24 as shown in FIG. 3, an off time of laser output shown in (c) of FIG. 9 is the recording sheet interval time. However, since an object of the invention is to improve processing efficiency by making the only one image processing portion 18 serve for both image processing for print recording and scan image processing, the three time intervals Tb11, Tb12 and Tb13 in image processing for print recording of (b) of FIG. 9 showing the operation timing of the image processing portion 18 will be described as the recording sheet interval times below.

Although image processing of the first and second scan documents as the second set of image data is executed by the use of the recording sheet intervals, the image processing cannot be executed in the first recording sheet interval time Tb11 because the second copy document is being read in the scanner portion 3. Therefore, execution of image processing of the first and second scan documents is started in the second recording sheet interval time.

Image processing of the second set of image data is started first by reading the first and second scan documents by the scanner portion 3 as shown in (d) of FIG. 9. At the time of reading of the second set of image data by the scanner portion 3, there is no need to cause the image processing portion 18 to operate, so that reading of the first scan document is started so as to overlap with the print recording image processing time Tb2 by a little time Tx2, and reading of the first and second scan documents is executed at the timing of the second and third recording sheet interval times Tb12 and Tb13. Since one sheet of image data is read from each of the first and second scan documents, times Td1 and Td2 required for reading each are longer than the second and third recording sheet interval times Tb12 and Tb13.

However, since the second set of image data having been read needs to be processed in a recording sheet interval, the data is subjected to image division so that a time required for image processing is within a recording sheet interval time. Therefore, in the case of the example of FIG. 9, as shown in (e) of FIG. 9, the second set of image data of the first scan document is divided into two by the image dividing portion 16 so that a time required for scan image processing is within a recording sheet interval time. The second set of image data of the second scan document is subjected to image processing at such timing that print recording image processing ends four times and there is no need to cause the image processing portion 18 to operate for print recording, so that the data is subjected to image processing as one sheet of image data without being subjected to image division.

First divided image data and second divided image data obtained by dividing the second set of image data of the first scan document into two are subjected to image processing in the second and third recording sheet intervals. Image processing times of the first divided image data and the second divided image data are times Te1 and Te2, respectively, and these times are shorter than the second and third recording sheet interval times Tb12 and Tb13 (Te1<Tb12, Te2<Tb13).

Image processing of the first divided image data is started at time t2 a time Tx3 behind time t1 at which the second print recording image processing ends and the second recording sheet interval starts, and finished at time t3 a time Tx4 ahead of time t4 at which the second recording sheet interval ends and the third printing image processing starts. Moreover, image processing of the second divided image data is started at time t6 a time Tx5 behind time t5 at which the third printing image processing ends and the third recording sheet interval starts, and finished at time t7 a time Tx6 ahead of time t8 at which the third recording sheet interval ends and the fourth printing image processing starts. The times Tx3 and Tx5 are times required for changing over the registers of the image processing portion 18 from the second register group to the first register group, and the times Tx4 and Tx6 are times required for changing over the registers of the image processing portion 18 from the first register group to the second register group. The remaining second set of image data that has not been processed within the recording sheet intervals is subjected to image processing at the timing Te3 after completion of printing.

The second set of image data of the first and second scan documents is subjected to image processing at the aforementioned timing, and transferred to the control portion 11 with a little delay time from the timing of image processing as shown in (f) of FIG. 9. The control portion 11 stores the processed second set of image data into the image memory 15, and when image processing of all the second set of image data is completed, the control portion reads out the second set of image data from the image memory 15 and sends to the external computer 5.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus which executes image processing and print recording in such a manner that a first set of image data is image-processed, thereafter is print-recorded on a plurality of recording sheets and in parallel with the print recording of the first set of image data, a second set of image data is image-processed, the image forming apparatus comprising:
   an image reading portion for reading image formed on a document;
   an image processing portion for executing image processing of the image data;
   a printing portion for executing print recording of the image data;
   a recording sheet interval setting portion for setting a recording sheet interval of the recording sheets subjected to print recording of the first set of image data, which recording sheet interval is an interval between a position where print recording to a recording sheet ends and a position where print recording to a succeeding recording sheet starts;
   an image dividing portion for preparing divided image data by dividing image data for one sheet of document of the second set of image data read by the image reading portion into a plurality divisions; and
   a control portion for controlling the operation of the image processing portion so that the divided image data is image-processed in the recording sheet interval.

2. The image forming apparatus of claim 1, wherein the image dividing portion divides the image data of the second set of image data for one sheet of document so that each of boundary sections which are data start portions of the divisions has an overlapping portion of image data with a boundary section which is a data end portion of an immediately preceding division, and each of boundary sections which are data end portions of the divisions has an overlapping portion of image data with a boundary section which is a data start portion of an immediately following division.

3. The image forming apparatus of claim 1, further comprising an image memory for storing the first set of image data ready for printing,
   wherein the image dividing portion divides the second set of image data so as to be divided into a number corresponding to the number of sheets ready for printing of the first set of image data stored in the image memory.

4. The image forming apparatus of claim 1, further comprising a recording sheet interval regulating portion for regulating a recording sheet interval to set a regulated recording sheet interval to the recording sheet interval setting portion.

5. The image forming apparatus of claim 4, further comprising a mode changeover portion for making changeover between an image processing priority mode in which the control portion controls the operation of the image processing portion so that an image processing time of the divided image data of the second set of image data becomes the shortest and a recording sheet interval minimization mode in which the control portion controls the operation of the recording sheet interval setting portion to minimize a conveyance interval of a plurality of recording sheets subjected to print recording of the first set of image data,
   wherein the paper interval regulating portion regulates a recording sheet interval in accordance with the output of the mode changeover portion.

6. The image forming apparatus of claim 1, wherein the image processing portion has:
   a first register for holding an operation setting relating to image processing of the second set of image data, and
   a second register for holding an operation setting relating to print recording of the first set of image data, and
   wherein changeover between the first register and the second register is carried out in accordance with the beginning and end of the recording sheet interval.

\* \* \* \* \*